United States Patent [19]
Valentine

[11] Patent Number: 6,155,870
[45] Date of Patent: Dec. 5, 2000

[54] BATTERY JUMP START SYSTEM WITH INTEGRAL CORD STORAGE POUCH

[75] Inventor: Craig D. Valentine, Grand Rapids, Ohio

[73] Assignee: Clarke Power Products, Inc., Bowling Green, Ohio

[21] Appl. No.: 09/062,069

[22] Filed: Apr. 17, 1998

[51] Int. Cl.[7] .................................................. H01R 11/00
[52] U.S. Cl. ........................................ 439/504; 439/501
[58] Field of Search ................................ 439/500–506, 439/522, 528, 627, 726, 754, 759, 772, 952; 320/103–107, 111, DIG. 18, DIG. 19, FOR 101, FOR 119, FOR 147

[56] References Cited

U.S. PATENT DOCUMENTS

| | | | |
|---|---|---|---|
| 2,565,273 | 8/1951 | Shuler et al. | 320/105 |
| 4,902,955 | 2/1990 | Manis et al. | 439/504 |
| 4,983,473 | 1/1991 | Smith | 439/504 |
| 5,024,360 | 6/1991 | Rodriguez | 2/102 |
| 5,211,321 | 5/1993 | Rodriguez | 224/604 |
| 5,344,339 | 9/1994 | Cheslock | 439/501 |
| 5,586,655 | 12/1996 | McBride | 206/388 |
| 5,589,292 | 12/1996 | Rozon | 439/504 |
| 5,680,026 | 10/1997 | Lueschen | 320/2 |
| 5,725,189 | 3/1998 | Landy | 248/205.2 |

FOREIGN PATENT DOCUMENTS 405328620  12/1993  Japan ........................... 320/FOR 101

Primary Examiner—Brian Sircus
Assistant Examiner—Michael C. Zarroli
Attorney, Agent, or Firm—MacMillan, Sobanski & Todd, LLC

[57] ABSTRACT

A jump start system includes a housing, a battery attached to the housing, and a pair of electrical cables connected to the battery. A removable charger cord is adapted to be operatively connected to the battery. A pouch attached to the housing is adapted to hold the removable charger cord.

3 Claims, 1 Drawing Sheet

BATTERY JUMP START SYSTEM WITH INTEGRAL CORD STORAGE POUCH

BACKGROUND OF THE INVENTION

This invention relates in general to portable battery systems for jump starting vehicles, such as automobiles, boats, and the like. In particular, this invention relates to such a portable battery jump start system including a housing having removable charger cords and an integral pouch for conveniently storing the charger cords during non-use.

Virtually all vehicles in common use today, such as automobiles, trucks, boats, and the like, include an engine for providing motive power. A battery is typically provided on such vehicles to store electrical energy for use in starting the engine. Once the engine is started, the battery is typically re-charged for subsequent use. However, it is well known that the vehicle battery may occasionally become sufficiently drained of electrical energy as to become unable to start the vehicle engine. For example, a vehicle battery may lose its charge as a result of extensive use, a failure of the re-charging system of the vehicle, weather conditions, or when the lights or other electrical accessories of the vehicle are left on when the engine is turned off.

When this occurs, it is well known to "jump-start" the vehicle using a charged battery contained in a different vehicle. Typically, this jump-starting process is accomplished by moving another vehicle having a charged battery adjacent to the disabled vehicle, connecting electrical cables in parallel across the charged and discharged batteries, and starting the disabled vehicle. This method suffers from the well known drawbacks of requiring that another vehicle be readily available and positioning the two vehicles sufficiently close together to permit the electrical cables to extend therebetween.

To alleviate these drawbacks, a number of portable battery jump start systems are known in the art. A typical portable battery jump start system includes a housing containing battery and a pair of electrical cables. The cables may be either permanently secured to the housing or may be removable connected thereto. In either event, the electrical cables are relatively long to facilitate the connection of the ends thereof to the discharged battery contained in the disabled vehicle. The portable battery jump start system is designed to be stored within the vehicle for emergency use when needed. Typically, the portable battery jump start system can store a sufficient amount of electrical energy to perform several jump starts, after which it must be re-charged by connection to a source of electrical energy. Thus, most portable battery jump start systems are also provided with an electrical power cord that can be plugged into a conventional household electrical outlet for re-charging.

When the portable battery jump start system is not in use, it is desirable that it be stored neatly and carefully for subsequent use. However, as mentioned above, the electrical cables and the power cord are relatively long and inconvenient for storage. Furthermore, in those portable battery jump start systems where the electrical cables are removable connected to the housing, the electrical cables are frequently disconnected therefrom and may become lost or damaged. Thus, it would be desirable to provide an improved portable battery jump start system having a structure for conveniently storing the electrical cables and power cords during non-use.

SUMMARY OF THE INVENTION

This invention relates to a portable battery jump start system, such as may be used for jump starting a vehicle or boat. The jump start system includes a housing, a battery contained within the housing, and a pair of electrical cables connected to the battery. In a preferred embodiment of the invention, the jump start system includes both an AC charger cord and a DC charger cord so that the jump start system can be re-charged by connection to either an AC power source or a DC power source. The charger cords may be disconnected from the housing when not in use. It has been discovered that the loose charger cords are sometimes lost or accidentally damaged. To address this problem, the jump start system of the invention includes a pouch for holding the charger cords when they are not being used. After re-charging the battery, the charger cord is disconnected from the housing and stored in the pouch.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
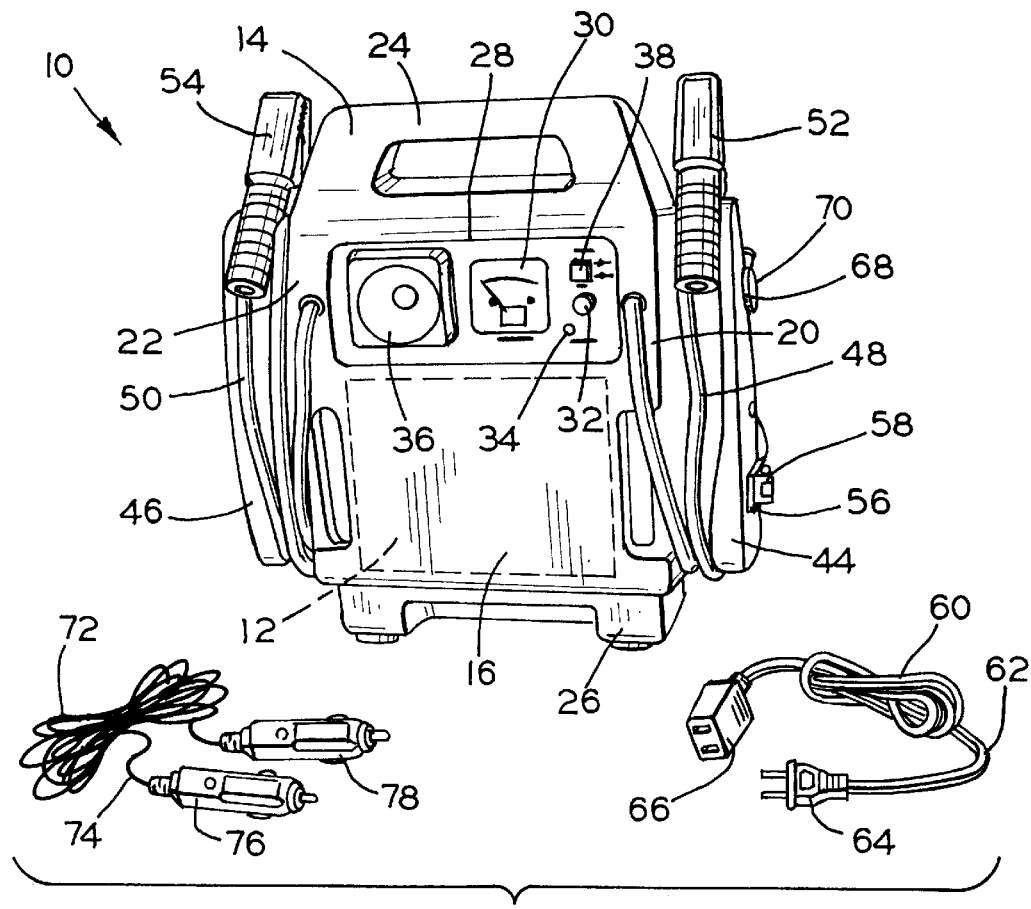
FIG. 1 is a front perspective view of a portable battery jump start system in accordance with the invention.
Figure 2:
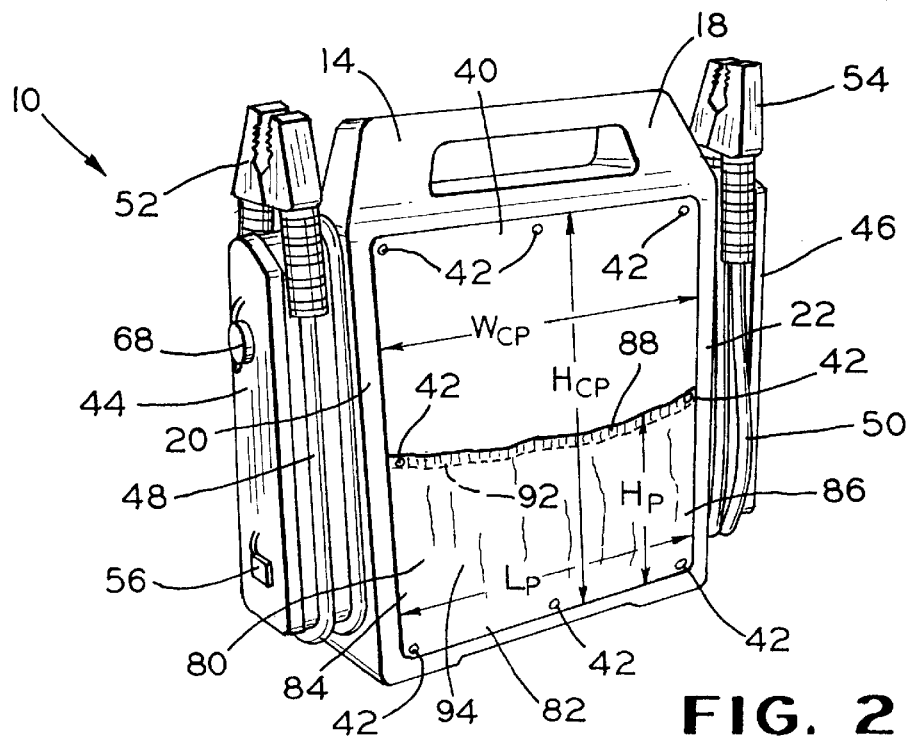
FIG. 2 is a rear perspective view of the portable battery jump start system illustrated in FIG. 1.

Referring now to the drawings, there is illustrated in FIGS. 1 and 2 a portable battery jump start system 10 in accordance with this invention. The jump start system 10 includes a re-chargeable battery 12 that is capable of storing a sufficient amount of electrical energy for jump starting a vehicle engine. Preferably, the battery 12 is a heavy-duty, lead-acid battery with a power of 12 volts/DC and 17.5 ampere-hours. The battery 12 is preferably sealed and maintenance free.

The battery 12 is contained within a rigid housing 14. Preferably, the housing 14 is formed of a strong, lightweight plastic material such as polyethylene. The housing 14 includes a front side 16, a back side 18, a left side 20, and a right side 22. A handle 24 is formed at the upper end of the housing 14 to facilitate carrying the jump start system 10. A base 26 is formed at the lower end of the housing 14. A control panel 28 is provided in the front side 16 of the housing 14. The control panel 28 includes a battery meter 30, a battery test switch 32, a charging LED 34, an emergency light 36 and an emergency light switch 38.

A cover plate 40 is attached to the back side 18 of the housing 14. The cover plate 40 covers a compartment (not shown) inside the housing 14 which contains the battery 12 and other components of the jump start system 10. The cover plate 40 is attached to the housing 14 by inserting a plurality of threaded fasteners 42 (eight in the illustrated embodiment) through apertures (not shown) formed through the corners and sides of the cover plate 40 and into engagement with corresponding threaded apertures (not shown) in the housing 14. Preferably, the threaded fasteners 42 are "Phillips" (cross-head) screws.

A left cable mount 44 is formed on the left side 20 of the housing 14, and a right cable mount 46 is formed on the right side 22 of the housing 14. Left and right electrical cables 48 and 50 are wrapped, respectively, around the left and right cable mounts 44 and 46 and connected to the battery 12. Preferably, the electrical cables 48 and 50 are heavy-duty #4 AWG industrial cables. Left and right electrical clamps or "alligator" clamps 52 and 54 are attached to the ends of the left and right electrical cables 48 and 50, respectively. Preferably, the electrical clamps 52 and 54 are heavy-duty 400 amp electrical clamps. In the preferred embodiment, the right electrical clamp 54 is the positive clamp for connection to the positive terminal of the vehicle battery, and the left electrical clamp 52 is the negative clamp for connection to a non-moving metal part of the vehicle engine.

After using the jump start system 10 to jump start a vehicle, the battery 12 of the jump start system 10 can be re-charged from either an AC power source or a DC power source. This feature enhances the convenience and versatility of the jump start system 10. The jump start system 10 includes a built-in 120 volt AC re-charger/converter (not shown) for re-charging the battery 12 from an AC power source. A 120 volt AC plug 56 is mounted in the left cable mount 44 of the jump start system 10 and connected to the re-charger/converter. The AC plug 56 is covered by a removable cover 58. The jump start system includes a 120 volt AC charger cord 60. In the preferred embodiment, the AC charger cord 60 includes a 4-foot cord 62 having a plug 64 at one end and a receptacle 66 at the other end. To re-charge the battery 12, the receptacle 66 of the AC charger cord 60 is plugged into the AC plug 56 of the jump start system 10, and the plug 64 of the AC charger cord 60 is plugged into any convenient 120 volt AC power outlet such as found in a house.

The jump start system 10 also includes a 12 volt DC cigarette lighter-type socket 68 mounted in the left cable mount 44 and connected to the battery 12. The DC socket 68 is covered by a removable cover 70. The jump start system 10 includes a 12 volt DC charger cord 72. In the preferred embodiment, the DC charger cord 72 includes a 4-foot cord 74 having a pair of 12 volt DC cigarette lighter-type plugs 76 and 78 at both ends. To re-charge the battery 12, one of the plugs 76 of the DC charger cord 72 is plugged into the DC socket 68 of the jump start system 10, and the other plug 78 of the DC charger cord 72 is plugged into a 12 volt cigarette lighter socket of a vehicle or boat.

As discussed above, when not in use, the AC charger cord 60 and the DC charger cord 72 are disconnected from the housing 14 and held loose with the jump start system 10 so they are available for re-charging. For example, the jump start system 10 and charger cords 60 and 72 may be stored in the trunk of a vehicle. It has been discovered that the loose charger cords 60 and 72 are sometimes lost or accidentally damaged. To address this problem, the jump start system 10 of the invention includes means for avoiding the loss or damage of the loose charger cords 60 and 72. Specifically, the jump start system 10 includes a pouch 80 for holding the charger cords 60 and 72 when they are not being used. After re-charging the battery 12, the charger cord 60 or 72 is disconnected from the housing 14 and stored in the pouch 80 attached to the back side 18 of the housing 14.

While the illustrated pouch 80 is attached to the cover plate 40 on the back side 18 of the housing 14, the pouch 80 can be attached at any convenient location on the housing, such as the front side 16. The illustrated pouch 80 covers the lower half of the cover plate 40. The pouch 80 can be any shape and size suitable for holding the charger cords 60 and 72. Preferably, the pouch 80 is generally rectangular in shape, having a length $L_P$ which is approximately the same as the width $W_{CP}$ of the cover plate 40. In this manner, the pouch 80 has a maximum length for holding the charger cords 60 and 72 without interfering with the removal of the cover plate 40 from the back side 18 of the housing 14. Preferably, the pouch 80 has a height $H_P$ which is approximately one-half the height $H_{CP}$ of the cover plate 40. The height $H_P$ provides sufficient space in the pouch 80 for holding the charger cords 60 and 72, but not so much space that it would be difficult to reach down inside the pouch 80 for obtaining one of the charger cords 60 or 72. While the preferred jump start system 10 includes both an AC charger cord 60 and a DC charger cord 72, in some embodiments of the invention only a single charger cord will be used. In such embodiments, the pouch may only be large enough for holding a single charger cord, or it can be larger for holding the cord and other accessories.

The illustrated pouch 80 includes a lower edge 82, a left side edge 84 and a right side edge 86. The pouch 80 is attached to the cover plate 40 by some of the threaded fasteners 42 used to secure the cover plate 40 to the back side 18 of the housing 14. Any suitable means can be used for attaching the pouch 80 to the housing 14. The pouch 80 also includes an upper edge 88 which is left unattached so that the charger cords 60 and 72 can be placed into the pouch 80.

Preferably, the pouch 80 is constructed so that a narrow pocket 92 is formed along the entire length of the upper edge 88 of the pouch 80, and an elastic band (not shown) is contained within the pocket 92. The elastic band is formed of any suitable elastomeric material such as rubber. The ends of the elastic band are secured to the upper corners of the pouch 80 by the use of adhesive or other suitable means. The material along the upper edge 88 of the pouch 80 is crimped so that the upper edge 88 can be pulled away from the cover plate 40 by stretching the elastic band. This facilitates the placement of the charger cords 60 and 72 into the pouch 80. The central portion 94 of the pouch 80 is provided with some excess material so that the pouch 80 can move apart from the cover plate 40 to provide space for the charger cords 60 and 72.

The pouch 80 is made from any suitable material, preferably a synthetic fabric material. Preferably, the material is sufficiently flexible to allow flexing away from the cover plate 40 to provide space for the charger cords 60 and 72. The color of the pouch 80 is preferably the same color as the housing 14.

In addition to jump starting vehicles and boats, the jump start system 10 can also be used as a 12 volt DC power source for various accessories that operate on DC power. Such accessories include cell phones, radios, fans, depth finders, camcorders, VCR's, spotlights, electric tools, bilge pumps, electric coolers, air compressors and car vacuums. A 12 volt DC cigarette lighter-type plug of the accessory is plugged into the DC socket 68 of the jump start system 10 to provide power to the accessory. The pouch 80 of the jump start system 10 can be used for holding some types of accessories in addition to or instead of the AC charger cord 60 and the DC charger cord 72. As used herein, the term "accessories" will include the above-mentioned accessories as well as the loose AC charger cord 60 and the loose DC charger cord 72 (the "loose cord accessories"). Alternatively, the pouch 80 of the jump start system 10 can be used for holding the left and right electrical cables 48 and 50 during non-use.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A portable battery jump start system comprising:

a housing including a front side and a rear side;

a battery contained within said housing;

a pair of electrical jumper cables connected to said battery and adapted to be connected to a battery to be charged;

a removable AC charger cord adapted to be operatively connected to said battery contained within said housing for re-charging said battery;

a removable DC charger cord adapted to be operatively connected to said battery contained within said housing for re-charging said battery; and a pouch attached to one of said front and rear sides of said housing, said pouch being formed from a flexible material with an elasticized opening for supporting said AC and DC charger cords during non-use.

2. The portable battery jump start system defined in claim 1 wherein said pouch is attached to a cover plate secured to said back side of said housing.

3. The portable battery jump start system defined in claim 2 wherein said pouch substantially covers a lower half of said cover plate.

* * * * *